D. R. KNAPP & H. E. CADE.
ELECTRIC CURRENT REGULATOR.
APPLICATION FILED MAY 29, 1907.
903,580.
Patented Nov. 10, 1908.
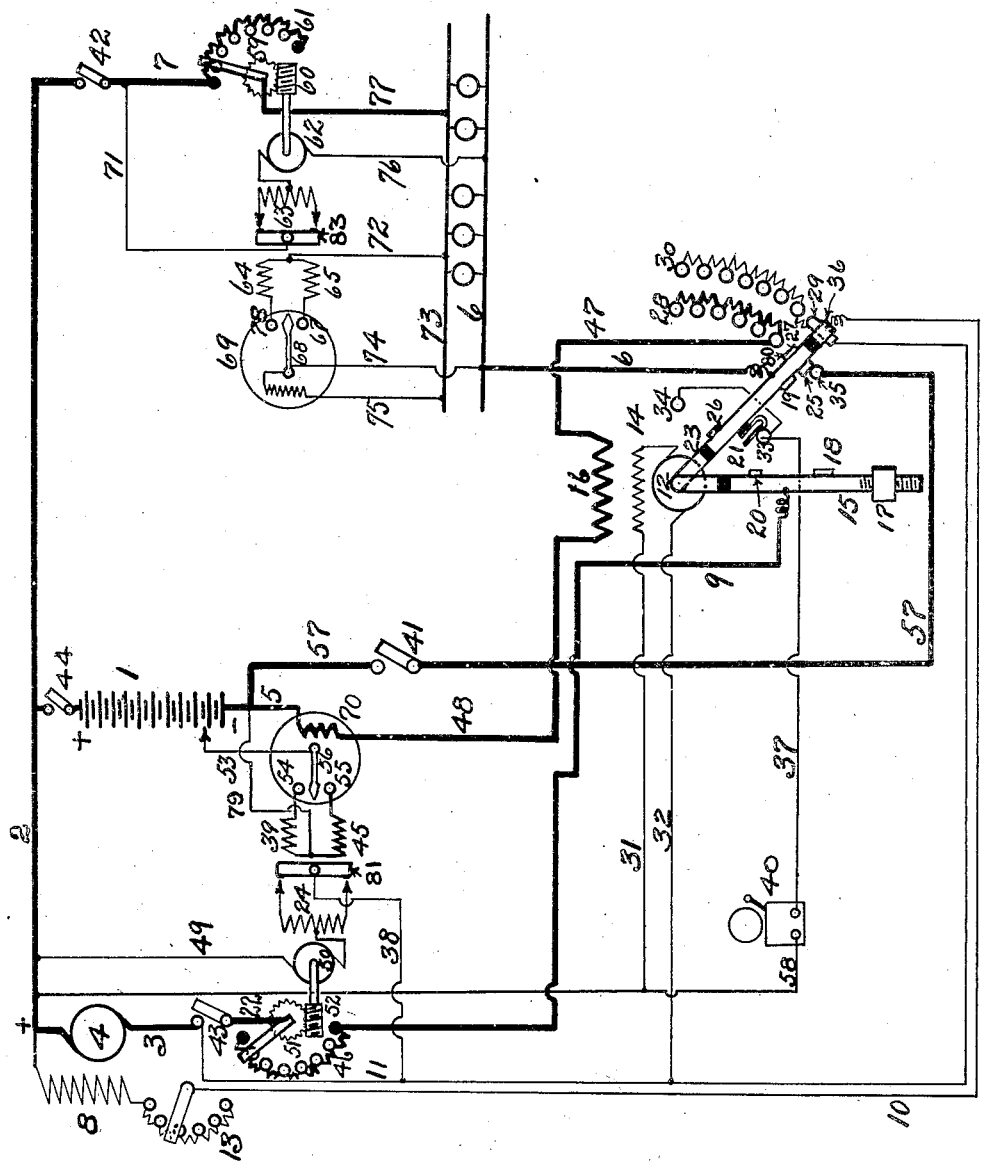
Witnesses.
Inventors.
David R. Knapp,
Howard E. Cade

UNITED STATES PATENT OFFICE.

DAVID R. KNAPP, OF PHILADELPHIA, AND HOWARD E. CADE, OF PENCOYD, PENNSYLVANIA.

ELECTRIC-CURRENT REGULATOR.

No. 903,580.  Specification of Letters Patent.  Patented Nov. 10, 1908.

Application filed May 29, 1907.  Serial No. 376,434.

*To all whom it may concern:*

Be it known that we, DAVID R. KNAPP and HOWARD E. CADE, citizens of the United States, residing, respectively, at Philadelphia, in the county of Philadelphia, and at Pencoyd, in the county of Montgomery, both in the State of Pennsylvania, have invented certain new and useful Improvements in Electric-Current Regulators, of which the following is a specification.

This invention relates to electromechanical contrivances employed for storage battery charging and discharging current and voltage control wherein automatic regulation is desirable without loss of efficiency in its operation; and the object of our improvements is to provide a method of an automatic electrical operated apparatus for, first, closing the charging circuit on the charging supply circuit whenever the voltage of the charging source is sufficiently high to close the electrical connections and allow a charging current to flow; second, sounding an alarm upon the closing of the charging circuit upon the supply circuit; third, opening the charging circuit from the supply circuit when the voltage of the supply circuit becomes lower than that of the battery being charged; fourth, interposing a variable resistance in the charging circuit whenever the voltage of the charging circuit is such as would otherwise cause an excessive flow of charging current through the charging circuit; fifth, interposing a variable auxiliary resistance in series with the supply circuit generator field winding, and its field rheostat, whenever the voltage of the supply circuit is such as would cause an excessive flow of charging current through the charging circuit, as also through the distribution circuit, when it is connected with the supply circuit; sixth, closing the storage battery on the distribution circuit whenever the voltage of the supply circuit employed in charging the battery falls below that of the battery being charged; seventh, closing the supply circuit on the distribution circuit whenever the voltage of the supply circuit employed in charging the battery is sufficient to close the charging circuit and cause a current to flow through same, eighth, sounding an alarm whenever the voltage of the supply circuit is such as to cause an excessive flow of current through the charging circuit, as also through the distribution circuit when it is connected to the supply circuit; ninth, sounding an alarm whenever the battery is wrongly connected to the charging circuit; tenth, sounding an alarm upon breaking of the charging current; eleventh, interposing additional auxiliary variable resistance and means for operating same, to that mentioned in the fourth object, for the purpose of maintaining a closer regulation of current in the charging circuit as also a closer regulation of voltage in the distribution circuit; twelfth, interposing an additional variable resistance in the distribution circuit when the source of supply is such as would cause excessive voltage to exist in said circuit.

Referring to the drawing, Figure 1, 1 is the battery that is desired to be charged and discharged.

2 is the positive lead from the generator 4 which is the source of supply and 3 is the negative lead.

12 is a motor provided with two field windings 14 and 16. The field winding 14 is connected in series with the armature winding and the combined resistance is sufficiently high to enable it to be connected direct across the dynamo mains without detrimental flow of current. The auxiliary field winding 16 is connected in series with the battery 1 that is desired to be charged and discharged and its direction of winding is such that when a charging current is flowing through same the magnetomotive force will be in the same direction as that of winding 14 and a discharge current will oppose and weaken winding 14.

On the armature shaft there is rigidly attached the weighted arm 15. This arm is provided with contacts 18 and 20 and the adjustable weight 17. Also on the armature shaft is the rheostat arm 23. This arm is free to turn on the armature shaft and its travel is limited by the stop points 34 and 35. The two arms are insulated close to the shaft which makes them electrically separate. On the arm 23 there is attached the spring contact 21 which engages with the contact post 33 on its lower position and is also adapted to engage with contact 20 when arms 15 and 23 are engaged. Contact 26 is adapted to engage with stop contact post 34, which limits the angular travel of arms 15 and 23. Contact 18 is adapted to engage with contact 19 and contact 80 is adapted to engage with rheostat 27—28. Contact 25 is adapted to engage with stop contact 35. Upon the end of arm 23 is the insulated brush 36 having the lead 10 attached thereto by flexible connection.

27—28, and 29—30 are rheostat points.

8 is the field winding of the generator 4 and 13 its rheostat.

Contacts 29—30 are rheostat points of an auxiliary rheostat which is connected in series with the rheostat 13 by leads 10 and 11, lead 11 being connected to rheostat point 29.

70 is an ammeter in series with the charging current and is provided with two insulated contacts 54 and 55 which are adapted to engage with the indicating member 56 of the ammeter. The indicating member is provided with suitable contacts thereon to engage with the above insulated contacts.

50 is a motor provided with a two part field winding 24 for the purpose of providing a means for reversing the direction of rotation of the motor armature. On the shaft of the motor is the worm 52 which engages with the worm wheel 51 and upon which is attached the arm of the rheostat 46. Rheostat 46 is in series with the charging leads. The field winding 24 and the armature of motor 50 are connected in series and are provided with energizing leads 38 and 49.

6 and 73 are leads of a distribution circuit.

69 is a voltmeter connected by leads 74 and 75 across the leads 6 and 73 and is provided with two insulated contacts 67 and 78 which are adapted to engage with the indicating member 68. The indicating member 68 is provided with suitable contacts thereon for engaging with the above mentioned contacts.

64 and 65 are windings of relay magnets energized by leads 72 and 74.

62 is a motor provided with a two part field winding 63 for the purpose of providing a means for reversing the direction of the armature of the motor.

40 is a bell or gong and provided with leads 58 and 37. Upon the shaft of the motor 62 is attached the worm 60 which engages with the worm wheel 59. The arm of rheostat 61 is rigidly attached to the worm wheel 59. The armature of motor 62 and its field winding 63 are in series and are energized by the leads 76 and 71. The relay magnets are energized by leads 72 and 74. The relay magnets 39 and 45 are energized by the leads 53 and 79. 41, 42, 43, and 44 are switches. Lead 22 connects switch 43 to rheostat 46. Lead 47 connects rheostat 27—28 to the auxiliary field winding 16.

31 and 32 are the energizing leads of armature 12 and winding 14.

5 is a lead connecting the storage battery to the ammeter 70.

48 is a lead connecting the ammeter 70 to the auxiliary series field winding 16.

9 is a lead connecting rheostat 46 to the weighted arm 15 by flexible connection.

57 is a lead connecting the storage battery to stop post 35 through switch 41.

6 is a lead connecting the distribution circuit to the rheostat arm 23 by flexible connection. Lead 7 connects rheostat 61 to lead 2 through switch 42. Lead 77 connects rheostat 61 to the distribution circuit. The end points of rheostat 61 and 46 are stop points and limit the travel of the respective rheostat arms.

81 and 83 are armatures for the respective relay magnets and are pivoted in the center and are provided with the usual means to return them to the open position upon the demagnetizing of their respective magnets.

The foregoing apparatus is suitably mounted upon an appropriate panel and is properly proportioned and connected throughout including the switches indicated, all of which will be readily understood by those skilled in the art to which this invention relates. Its mode of operation will be substantially as follows. All the switches being closed and sufficient voltage being present in the supply circuit a flow of current corresponding to such voltage will take place in the motor 12 circuit which includes the electro magnet winding 14, causing a corresponding torque to act upon the motor armature shaft 13 and operate the weighted contact lever attached to same. It is obvious that the angular distance of travel of the weighted contact lever will be regulated by the intensity of the armature torque and its opposing force of gravity acting through its pendulum weight. As the torque of the armature varies proportionally with the amount of current that is flowing through same and the amount or intensity of its field strength. Any change of the voltage of the supply circuit will cause a corresponding change in the amount of current flowing through the armature and its field winding circuits and thereby producing upon the armature shaft a corresponding change in its torque that will operate the weighted contact lever accordingly. When the voltage present in the supply circuit is sufficient to cause a flow of current through the battery charging circuit, the weighted contact lever will move to that position which will engage the contact points 18 and 19 and also move the arm 23 so that contact 80 engages rheostat point 27, thereby closing the battery charging circuit and accomplishing the hereinbefore mentioned first object of our said invention. The moving of the weighted contact lever, as just described, also operates to engage contact points 20 and 21, thereby closing the gong circuit and cause the gong to sound the signal that indicates the closing of the charging circuit, thereby accomplishing the hereinbefore mentioned second part of the object of our said invention. The closing of the charging circuit, as just described, also operates to close its engaged points more firmly, because of the increased torque following upon the increased field strength of the motor armature resulting from the flow of the charging current through the windings of the auxiliary electromagnet, and the further angular movement of the weighted contact lever, which closes those contacts more firmly, also operates to slightly further move the rheostat contact arm thereby opening the gong circuit through the resulting disengagement of contact points 21 and 33, whereby the ceasing of the gong sound indicates that the battery is being charged providing contact points 18 and 19 are found remaining in contact with each other.

In case the voltage of the supply circuit should decrease, during the charging process, below that of the battery being charged, there would be a corresponding decrease in the field strength due to a weakened field augmented by the resulting opposing polarity caused by the reversed current flowing through the windings of the auxiliary electro magnet by reason of the resulting discharge battery current that would occur upon such decrease of voltage in the supply circuit, and therefore a corresponding decrease would occur in the intensity of the torque of the armature shaft, which, being opposed by the constant force of gravity acting through the weighted contact lever, would then be insufficient to maintain the aforesaid contact made by the engagement of contact points 18 and 19, and consequently the charging circuit would thereby be opened and an escape of battery current through the charging connections be prevented; thus accomplishing the hereinbefore mentioned third part of the object of our said invention. Under normal voltage conditions of charging a battery with our said improved method and apparatus the rheostat contact arm would remain in the heretofore mentioned engagement with the first contact button 27. In case the voltage of the supply circuit would suddenly increase beyond the normal conditions the increased resulting flow of current through the motor armature and its main and auxiliary field windings would increase the torque of the armature shaft and cause the weighted contact lever to move the rheostat contact arm to such other rheostat contact buttons as would interpose, in both the charging circuit and the auxiliary shunt generator field rheostat circuit, resistances necessary for reducing the generator to normal conditions of charging current through the battery; thereby accomplishing the hereinbefore mentioned fourth and fifth parts of the object of our said invention.

It is obvious that when the voltage of the generator suddenly falls below that of the battery the resulting decrease in the torque of the motor armature, caused by the weakening of the motor armature field, due to a reverse current flowing through the auxiliary field winding from the battery and a reduction of current through the motor field and armature winding due to the decreased voltage, will allow the constant force of gravity, acting on the weight of the weighted contact lever, to drop back and engage contact points 25 and 35, thus closing the storage battery on the distribution circuit, which thus accomplishes the hereinbefore mentioned sixth part of the object of our said invention.

It is also obvious that when the voltage of the generator is sufficient to close the charging circuit, as hereinbefore described, the movement of the weighted arm will cause contacts 18 and 19 to engage point 27 and thereby close the supply circuit on the distribution circuit; and thereby accomplish the hereinbefore mentioned seventh part of the object of our said invention.

It is also obvious that when the potential of the supply circuit is such as to cause the rheostat contact arm to be moved against the stop 34, thereby engaging contact points 26 and 34 and thus closing the gong circuit, the gong will sound an alarm, which, together with the position of the rheostat arm resting against stop 34, will accomplish the hereinbefore mentioned eighth part of the object of our said invention.

It is also obvious that should the connections of the terminals of the charging circuit be connected in a manner reverse to that of the normal, the voltage of the line will become negligible, by reason of the short circuit occurring under the voltage of the generator plus that of the battery and as the armature 12 and winding 14 are of high resistance they, in such case, will receive little or no current, hence the armature 12 will not be energized and therefore will be without torque, regardless of the amount of current or its direction of flow through winding 16, whence a vibrating or oscillating movement would be set up in the weighted contact lever, due to the voltage of the supply circuit closing contact points 18 and 19, followed by their prompt reopening; this oscillation of the weighted contact lever would cause an intermittent ringing of the gong because of the engaging and disengaging of contact points 20 and 21 with each vibration of said lever, and indicating that the battery had not been properly connected, whereby the hereinbefore mentioned ninth part of the object of our said invention would be accomplished.

It is also obvious that when the weighted contact lever is about to disengage its contact with the rheostat contact arm the contact points 21 and 33 will engage, thereby closing the gong circuit and cause the gong to ring; and that upon any further disengaging movement of the weighted contact lever taking place the contact points 20 and 21 will thereby become disengaged, whereupon the gong circuit being thereby opened, the gong will cease ringing; thereby accomplishing the hereinbefore mentioned tenth part of the object of our said invention.

It is also obvious that if the battery is charging and the voltage of the charging source does not vary enough to cause a change in the position of arm 23, that a movement of the indicating member 56 of the ammeter 70 will take place on account of its being sensitive to slight changes of current, which will cause the engagement of indicating member 56 with the insulated contact 54 or 55, depending whether a fall or rise of current had taken place. The engagement of these contacts will close a circuit through either relay magnet 39 or 45 and will cause the armature 81 to turn on its pivotal center and thereby closing the circuit of one part of field winding 24 with the armature of motor 50 and cause the motor to revolve, the direction of rotation depending on which part of the field winding is energized. The direction of rotation of the armature shaft being affected by the direction of flow of current through the two part field winding 24, a clockwise or counter clockwise motion is imparted to the worm 52, which in turn transmits the motion to the worm wheel 51 and thereby actuates the rheostat arm causing resistance to be cut in or out of the battery charging circuit, until the indicating member of ammeter 70 has moved sufficient to disengage the contacts that have been engaged, thus accomplishing the eleventh part of the object of our said invention.

It is also obvious that if the battery or dynamo is supplying energy to the distribution circuit and the voltage of the same should be higher or lower than a predetermined amount, the indicating member of the volt motor 69 will cause the engagement of its indicating member 68 upon contact 67 or 78, the engagement of said contacts will cause a current to flow through either of the relay magnets 64 or 65, thereby energizing the magnet and cause the attraction of armature 83 which will turn on its pivotal center and thereby close a circuit through one part of the field winding 63 with armature of motor 62 by the leads 76 and 71. This will cause the motor armature to revolve and actuate the rheostat 61 in a manner similar to that of rheostat 46, thereby cutting sections of resistance in or out, as the case may be, in the distribution circuit and accomplishing the twelfth part of the object of our said invention.

It is obvious that instead of resistance being inserted between the contact points 27—28 or between the contact points of rheostat 46, that storage battery end cells could be used for this purpose also that storage battery counter electro-motive cells could be used between the contact points of rheostat 61.

It is also obvious that the cutting out of the resistance 27—28 due to the resulting torque of the motor armature shaft in connection with the rheostat arm and a rheostat could be used for other purposes besides storage battery regulation where a variable resistance is desired.

Having thus described the nature and objects of our said invention, what we claim as new and desire to secure by Letters Patent, are—

1. In a storage battery charging system of the character described in combination with a storage battery and a source of supply and leads connecting the same to the said storage battery, a motor and a circuit provided to energize the said motor, a weighted arm rigidly attached to the shaft of the said motor, said arm provided with means for closing the aforesaid leads on the aforesaid battery upon a predetermined angular movement of the said weighted arm, all substantially as and for the purpose shown and described.

2. In a storage battery charging system of the character described in combination with a storage battery and a means for controlling the applied voltage to the said battery, and an electric motor provided with an armature and a circuit for energizing the field winding of said motor, the shaft of said armature provided with a weighted arm and means provided on said arm for controlling the means for controlling the applied voltage to said battery, all substantially as and for the purpose shown and described.

3. In a storage battery charging system of the character described in combination with a storage battery and a source of supply and leads connecting the same to said storage battery, a motor and a circuit for energizing the said motor, a rheostat inserted in the said charging leads for controlling the applied voltage to the said battery, and a weighted arm attached to the shaft of the aforesaid motor and provided with means to actuate the aforesaid rheostat, all substantially as and for the purpose shown and described.

4. In a storage battery charging system of the character described in combination with a storage battery and a source of supply and leads connecting the same to the said storage battery, a motor and a circuit for energizing the said motor, a movable arm provided with contacts for closing the storage battery on the leads to the source of supply, and of a weighted arm attached to the shaft of the said motor and adapted to engage with the aforesaid arm upon a predetermined angular movement of the armature shaft, all substantially as and for the purpose shown and described.

5. In a storage battery charging system of the character described in combination with a storage battery and a source of supply and leads connecting the same to the said storage battery, a motor and a circuit provided for energizing the said motor, a means inserted in the aforesaid leads to control the applied voltage to the said storage battery, an arm provided for controlling the said means, the shaft of the aforesaid motor provided with a weighted arm and adapted to engage with the aforesaid arm upon a predetermined angular movement of the said motor shaft, all substantially as and for the purpose shown and described.

6. In a storage battery charging system of the character described in combination with a storage battery and a source of supply and leads connecting the same to the said storage battery, a motor and a circuit for energizing the said motor, a means inserted in the aforesaid leads for controlling the applied voltage to the said storage battery, an arm provided with means for actuating the above means, a weighted arm attached to the shaft of the aforesaid motor and adapted to engage with the aforesaid arm upon a predetermined angular movement of the aforesaid motor shaft, all substantially as and for the purpose shown and described.

7. In a storage battery charging system of the character described in combination with a storage battery and a source of supply and leads connecting the same to the said storage battery, a series motor and a circuit provided for energizing said motor, an auxiliary generator field rheostat, a weighted arm attached to the shaft of the said motor and said arm provided with means to close the aforesaid leads on the storage battery, and also to actuate the said auxiliary generator field rheostat, all substantially as and for the purpose shown and described.

8. In a storage battery charging system of the character described in combination with a storage battery and a source of supply and leads connecting the same to the said storage battery, a motor and a circuit provided for energizing the said motor, and a means inserted in the aforesaid leads for controlling the applied voltage to the aforesaid storage battery, and an auxiliary generator field rheostat, and a means provided on the armature shaft of the aforesaid motor to actuate the aforesaid means and also the auxiliary generator field rheostat, all substantially as and for the purpose shown and described.

9. In a storage battery charging system of the character described in combination with a storage battery and a source of supply and leads connecting the same to the said storage battery, a motor and a circuit provided for energizing the said motor, a rheostat inserted in circuit with the aforesaid leads for controlling the applied voltage to the said storage battery, an auxiliary generator field rheostat, and a means provided on the armature shaft of the aforesaid motor for actuating the aforesaid rheostats, all substantially as and for the purpose shown and described.

10. In a storage battery charging system of the character described in combination with a storage battery and a source of supply and leads connecting the same to the said storage battery, a motor and a circuit for energizing the said motor, a means inserted in the aforesaid leads for controlling the applied voltage to the said storage battery, an auxiliary generator field rheostat, a weighted arm attached to the shaft of the aforesaid motor and provided with means for actuating the aforesaid means and the said auxiliary generator field rheostat, upon a predetermined movement of the armature shaft, all substantially as and for the purpose shown and described.

11. In a storage battery charging system of the character described in combination with a storage battery and a source of supply and leads connecting the same to the said storage battery, a motor and a circuit for energizing the said motor, a means inserted in the aforesaid leads for controlling the applied voltage to the aforesaid storage battery, an auxiliary generator field rheostat, an arm provided for actuating the aforesaid rheostat and the aforesaid means, and means provided on the armature shaft of the aforesaid motor for actuating the said arm, all substantially as and for the purpose shown and described.

12. In a storage battery charging system of the character described in combination with a storage battery and a source of supply and leads connecting the same to the said storage battery, a motor and a circuit provided for energizing the said motor, a means inserted in the aforesaid leads for controlling the applied voltage to the said storage battery, an auxiliary generator field rheostat, an arm provided for actuating the aforesaid means and the said auxiliary generator field rheostat, a weighted arm attached to the armature shaft of the aforesaid motor, and adapted to engage with the aforesaid arm upon a predetermined angular movement of the said motor shaft, all substantially as and for the purpose shown and described.

13. In a storage battery charging system of the character described in combination with a storage battery and a source of supply and leads connecting the same to the said storage battery, a motor and a circuit for energizing the said motor, a rheostat inserted in the said leads for controlling the applied voltage to the said storage battery, an auxiliary generator field rheostat, a weighted arm attached to the shaft of the aforesaid motor and provided with a means to actuate the aforesaid rheostats, all substantially as and for the purpose shown and described.

14. In a storage battery charging system of the character described in combination with a storage battery and a source of supply and leads connecting the same to the said storage battery, a motor provided with an auxiliary series field winding, said motor connected across the mains of the said source of supply, and the leads of said auxiliary field winding connected in series with the aforesaid leads, and a means provided on the armature shaft of the said motor to close the circuit from the source of supply on the said storage battery upon a predetermined angular movement of said armature shaft, all substantially as and for the purpose shown and described.

15. In a storage battery charging system of the character described in combination with a storage battery and a source of supply and leads connecting the same to the said battery, a series motor provided with an auxiliary series field winding, said motor connected across the mains of the said source of supply, and the leads of the said auxiliary series field winding, connected in series with the aforesaid leads, a means provided for controlling the applied voltage to the aforesaid storage battery, and a means provided on the armature shaft of the aforesaid motor to actuate the aforesaid means, all substantially as and for the purpose shown and described.

16. In a storage battery charging system of the character described in combination with a storage battery and a source of supply and leads connecting the same to the said storage battery, a series motor provided with an auxiliary series field winding, said motor connected across the mains of the said source of supply, and the leads of the said auxiliary series field winding connected in series with the aforesaid leads, a rheostat inserted in the charging leads for controlling the applied voltage to the said storage battery, and a means provided on the armature shaft of the aforesaid motor to actuate the aforesaid rheostat, all substantially as and for the purpose shown and described.

17. In a storage battery charging system of the character described in combination with a storage battery and a source of supply and leads connecting the same to the said storage battery, a series motor provided with an auxiliary series field winding, said motor connected across the mains of the said source of supply, and the leads of the said auxiliary series field winding connected in series with the aforesaid leads, a weighted arm attached to the shaft of the aforesaid motor, said arm provided with means for closing the aforesaid leads on the aforesaid battery upon a predetermined angular movement of the aforesaid arm, all substantially as and for the purpose shown and described.

18. In a storage battery charging system of the character described in combination with a storage battery and a source of supply and leads connecting the same to the said storage battery, a series motor provided with an auxiliary series field winding, said motor connected across the mains of the said source of supply, and the leads of said auxiliary series field winding connected in series with the aforesaid leads, a means provided for controlling the applied voltage to the said storage battery, the shaft of the aforesaid motor provided with a weighted arm and means provided on the said arm for controlling the aforesaid means, all substantially as and for the purpose shown and described.

19. In a storage battery charging system of the character described in combination with a storage battery and a source of supply and leads connecting the same to the said storage battery, a series motor provided with an auxiliary series field winding, said motor connected across the mains of the said source of supply, and the leads of said auxiliary series field winding connected in series with the aforesaid leads, a rheostat inserted in the charging leads for controlling the applied voltage to the said storage battery, a weighted arm attached to the shaft of the aforesaid motor and provided with means to actuate the aforesaid rheostat, all substantially as and for the purpose shown and described.

20. In a storage battery charging system of the character described in combination with a storage battery and a source of supply and leads connecting the same to the said storage battery, a series motor provided with an auxiliary series field winding, said motor connected across the mains of the said source of supply, and the leads of the said auxiliary series field winding connected in series with the aforesaid leads, a movable arm provided with contacts for closing the storage battery on the leads to the source of supply, and of a weighted arm attached to the shaft of the said motor and adapted to engage with the aforesaid arm, upon a predetermined angular movement of shaft of the said motor, all substantially as and for the purpose shown and described.

21. In a storage battery charging system of the character described in combination with a storage battery and a source of supply and leads connecting the same to the said storage battery, a series motor provided with an auxiliary series field winding, said motor connected across the mains of the said source of supply, and the leads of the said auxiliary series field winding connected in series with the aforesaid leads, a means inserted in the aforesaid leads to control the applied voltage to the said storage battery, an arm provided for controlling the said means, the shaft of the aforesaid motor provided with a weighted arm and adapted to engage with the aforesaid arm upon a predetermined angular movement of the said motor shaft, all substantially as and for the purpose shown and described.

22. In a storage battery charging system of the character described in combination with a storage battery and a source of supply and leads connecting the same to the said storage battery, a series motor provided with an auxiliary series field winding, said motor connected across the mains of the said source of supply, and the leads of said auxiliary series field winding connected in series with the aforesaid leads, and a means inserted in the aforesaid leads for controlling the applied voltage to the said storage battery and an arm provided with means for actuating the said means, a weighted arm attached to the shaft of the aforesaid motor and adapted to engage with the aforesaid arm upon a predetermined angular movement of said motor shaft, all substantially as and for the purpose shown and described.

23. In a storage battery charging system of the character described in combination with a storage battery and a source of supply and leads connecting the same to the said storage battery, a series motor provided with an auxiliary series field winding, said motor connected across the mains of the said source of supply, and the leads of the said auxiliary series field winding connected in series with the aforesaid leads, an auxiliary generator field rheostat, and a means provided on the said motor shaft for actuating the said auxiliary generator field rheostat, all substantially as and for the purpose shown and described.

24. In a storage battery charging system of the character described in combination with a storage battery and a source of supply and leads connecting the same to the said storage battery, a series motor provided with an auxiliary series field winding, said motor connected across the mains of the said source of supply, and the leads of the said auxiliary series field winding connected in series with the aforesaid leads, a means inserted in the aforesaid leads for controlling the applied voltage to the said storage battery, an auxiliary generator field rheostat, and a means provided on the armature shaft of the said motor to actuate the aforesaid means and also the auxiliary generator field rheostat, all substantially as and for the purpose shown and described.

25. In a storage battery charging system of the character described in combination with a storage battery and a source of supply and leads connecting the same to the said storage battery, a series motor provided with an auxiliary series field winding, said motor connected across the leads of the said source of supply and said auxiliary series field winding connected in series with the aforesaid leads, a rheostat inserted in circuit with the aforesaid leads for controlling the applied voltage to the said storage battery, an auxiliary generator field rheostat, and a means provided on the armature shaft of the said motor for actuating the aforesaid rheostats, all substantially as and for the purpose shown and described.

26. In a storage battery charging system of the character described in combination with a storage battery and a source of supply and leads connecting the same to the said storage battery, a series motor provided with an auxiliary series field winding, said motor connected across the mains of the said source of supply, and the leads of said auxiliary series field winding connected in series with the aforesaid leads, a means inserted in the aforesaid leads for controlling the applied voltage to the said storage battery, an auxiliary generator field rheostat, a weighted arm attached to the shaft of the aforesaid motor and provided with means for actuating the aforesaid means and the said auxiliary generator field rheostat upon a predetermined angular movement of the shaft of the said motor, all substantially as and for the purpose shown and described.

27. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the aforesaid leads, a means inserted in the aforesaid leads for controlling the applied voltage to the said storage battery, an auxiliary generator field rheostat, an arm provided for actuating the aforesaid rheostat and the aforesaid means, and means provided on the armature shaft of the aforesaid motor for actuating the said arm, all substantially as and for the purpose shown and described.

28. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the aforesaid leads, a means inserted in the aforesaid leads for controlling the applied voltage to the said storage battery, an auxiliary generator field rheostat, an arm provided for actuating the aforesaid means and the auxiliary generator field rheostat, a weighted arm attached to the armature shaft of the aforesaid motor and adapted to engage with the aforesaid arm upon a predetermined angular movement of the said motor shaft, all substantially as and for the purpose shown and described.

29. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the aforesaid leads, a rheostat inserted in the aforesaid leads for controlling the applied voltage to the said storage battery, an auxiliary generator field rheostat, a weighted arm attached to the shaft of the aforesaid motor and provided with means to actuate the aforesaid rheostats, all substantially as and for the purpose shown and described.

30. In a storage battery charging system of the character described in combination with a storage battery and a source of supply and leads connecting the same to the said storage battery, a series motor and a circuit provided for energizing the said motor, an auxiliary generator field rheostat, a weighted arm on the shaft of the aforesaid motor, said arm adapted to actuate the said rheostat, all substantially as and for the purpose shown and described.

31. In a storage battery charging system of the character described in combination with a storage battery and a charging source and leads connecting the same to the said storage battery, a series motor provided with an auxiliary series field winding, said motor connected across the mains of the said source of supply and the leads of the said auxiliary series field winding connected in series with the aforesaid leads, an auxiliary generator field rheostat and a means provided on the shaft of the aforesaid motor to actuate the said rheostat, all substantially as and for the purpose shown and described.

32. In a storage battery charging system of the character described in combination with a storage battery and a charging source and leads connecting the same to the said storage battery, a series motor provided with an auxiliary series field winding, said motor connected across the mains of the said source of supply and the leads of the said auxiliary series field winding connected in series with the aforesaid leads, an auxiliary generator field rheostat, a weighted arm on the shaft of the aforesaid motor, said arm adapted to actuate the said rheostat, all substantially as and for the purpose shown and described.

33. In a storage battery charging system of the character described in combination with a storage battery and a source of supply and leads connecting the same to the said storage battery, a series motor and a circuit provided for energizing the same, an electric gong and a circuit for energizing the same, a means provided, upon a predetermined angular movement of the armature shaft of the said motor, to close the aforesaid circuits to the said source of supply, all substantially as and for the purpose shown and described.

34. In a storage battery charging system of the character described in combination with a storage battery and a source of supply and leads connecting the same with the said storage battery, a series motor and a circuit provided for energizing the same, a means inserted in the aforesaid leads for controlling the applied voltage to the said storage battery, an electric gong and a circuit provided for same, a weighted arm attached to the shaft of the said motor and provided with means for actuating the aforesaid means and also for closing the said gong circuit upon a predetermined angular movement of the said motor shaft, all substantially as and for the purpose shown and described.

35. In a storage battery charging system of the character described in combination with a storage battery and a source of supply and leads connecting the same to the said storage battery, a series motor and a circuit provided for energizing the same, a rheostat inserted in the aforesaid leads for controlling the applied voltage to the said storage battery, an electric gong and a circuit provided for same, a weighted arm attached to the shaft of the said motor and provided with means for actuating the aforesaid rheostat and also for closing the said gong circuit, upon a predetermined angular movement of the motor shaft, all substantially as and for the purpose shown and described.

36. In a storage battery charging system of the character described in combination with a storage battery and a charging source and leads connecting the same to the said storage battery, a series motor provided with a circuit for energizing the same, a weighted arm attached to the shaft of said motor, an arm provided with means to close the storage battery on the source of supply, an electric bell and leads provided for energizing the same, the aforesaid weighted arm adapted to engage with the said arm upon a predetermined movement of said weighted arm, the engaging of the aforesaid arms provides means for closing the bell circuit and the battery charging circuit, all substantially as and for the purpose shown and described.

37. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the aforesaid leads, an electric gong and a circuit for energizing the same, a means provided to close the aforesaid circuits on the source of supply, upon a predetermined angular movement of the shaft of the said motor, all substantially as and for the purpose shown and described.

38. In a storage battery charging system of the character described in combination with a storage battery and a source of supply and leads connecting the same to the said battery, a series motor provided with an auxiliary series field winding, said motor connected across the mains of the said source of supply and the leads of the said auxiliary series field winding connected in series with the aforesaid leads, a means inserted in the aforesaid leads for controlling the applied voltage to the said storage battery, an electric gong and a circuit provided for same, a weighted arm attached to the shaft of the said motor and provided with means for actuating the aforesaid means and also for closing the said gong circuit upon a predetermined angular movement of the shaft of the said motor, all substantially as and for the purpose shown and described.

39. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the aforesaid leads, a rheostat inserted in the aforesaid leads for controlling the applied voltage to the said storage battery, an electric gong and a circuit provided for the same, a weighted arm attached to the shaft of the said motor and provided with means for actuating the aforesaid rheostat and also for closing the said gong circuit upon a predetermined angular movement of the motor shaft, all substantially as and for the purpose shown and described.

40. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the aforesaid leads, a weighted arm attached to the shaft of the said motor, an arm provided with means to close the storage battery on the source of supply, an electric bell and leads provided for energizing the same, the aforesaid weighted arm adapted to engage with the said arm upon a predetermined angular movement of the said weighted arm, the engaging of the aforesaid arms provides means for closing the bell circuit and the battery charging circuit, all substantially as and for the purpose shown and described.

41. In a storage battery charging system of the character described in combination with a storage battery and a source of supply and leads connecting the same to the said storage battery and an ammeter and a circuit closing apparatus, said ammeter provided with an indicating member with contacts thereon, insulated contacts disposed one on either side of the indicating member and adapted to engage therewith upon a predetermined movement of the indicating member, means actuated by the engaging of said contacts whereby additional means inserts a variable resistance in the said source of supply all substantially as and for the purpose shown and described.

42. In a storage battery charging system of the character described in combination with a storage battery and a source of supply and leads connecting the same to the said storage battery and a circuit closing apparatus, an electric measuring instrument provided with an indicating member with contacts thereon, insulated contacts disposed one on either side of the said indicating member and adapted to engage therewith upon a predetermined movement of said indicating member, means actuated by the engaging of said contacts whereby additional means inserts a variable resistance in the said source of supply, all substantially as and for the purpose shown and described.

43. In a storage battery charging system of the character described in combination with a storage battery and a charging source and leads connecting the same to the said storage battery, a series motor provided with an auxiliary series field winding, said motor connected across the mains of the said source of supply and the leads of the said auxiliary series field winding connected in series with the aforesaid leads, a means provided on the shaft of the said motor to close the source of supply on the said storage battery upon a predetermined angular movement of said shaft, a means provided in the storage battery leads for controlling the applied voltage to the said storage battery, an electrical measuring instrument provided in circuit with the said storage battery leads, said measuring instrument provided with an indicating member with contacts thereon, insulated contacts disposed one on each side of the said indicating member and adapted to engage therewith upon a predetermined movement of said indicating member, circuits controlled by said contacts whereby means are provided for actuating the means for controlling the applied voltage, all substantially as and for the purpose shown and described.

44. In a storage battery charging system of the character described in combination with a storage battery and a source of supply and leads connecting the same to the said storage battery, a series motor provided with an auxiliary series field winding, said motor connected across the mains of the said source of supply and said auxiliary series field winding connected in circuit with the aforesaid leads, a means provided on the shaft of the aforesaid motor to close the source of supply on the said storage battery upon a predetermined angular movement of the shaft of said motor, a means provided in the storage battery leads for controlling the applied voltage to the said battery, an ammeter also provided in the said circuit and provided with an indicating member with contacts thereon, insulated contacts disposed one on each side of the said indicating member and adapted to engage therewith upon a predetermined movement of said indicating member, circuits controlled by said contacts whereby means are provided for actuating the means for controlling the applied voltage, all substantially as and for the purpose shown and described.

45. In a storage battery charging system of the character described in combination with a storage battery and a source of supply and leads connecting the same to the said storage battery, a series motor provided with an auxiliary series field winding, said motor connected across the mains of the said source of supply and said auxiliary series field winding connected in series with the aforesaid leads, a means provided on the shaft of the said motor to close the storage battery on the source of supply upon a predetermined angular movement of said shaft, a rheostat inserted in the storage battery leads for controlling the applied voltage to the said storage battery, an ammeter also provided in the said circuit, said ammeter provided with an indicating member with contacts thereon, insulated contacts disposed one on each side of the said indicating member and adapted to engage therewith upon a predetermined movement of said indicating member, circuits controlled by said contacts whereby means are provided to actuate the said rheostat, all substantially as and for the purpose shown and described.

46. In a storage battery charging system of the character described in combination with a storage battery and a source of supply and leads connecting the same to the said storage battery, a series motor provided with an auxiliary series field winding, said motor connected across the mains of the said source of supply and the leads of the auxiliary series field winding connected in series with the charging leads, a means inserted in the said leads for controlling the applied voltage to the said storage battery, means provided on the shaft of the said motor to control the said means, an additional means inserted in the said leads to assist in controlling the applied voltage to the said storage battery, an ammeter provided in the charging leads of the said battery and provided with an indicating member with contacts thereon, insulated contacts disposed one on each side of the said indicating member and adapted to engage therewith upon a predetermined movement of said indicating member, circuits controlled by such contacts whereby means are provided for controlling the said additional means, all substantially as and for the purpose shown and described.

47. In a storage battery charging system of the character described in combination with a storage battery and a source of supply and leads connecting the same to the said storage battery, a series motor provided with a series field winding, said motor connected across the mains of the said source of supply and the leads of the auxiliary series field winding connected in series with the said leads, a rheostat inserted also in the said leads for controlling the applied voltage to the said storage battery, a means provided on the shaft of the said motor for controlling the said rheostat, an additional rheostat inserted in the charging leads to assist the aforesaid rheostat, an ammeter inserted in the charging leads and provided with an indicating member with contacts thereon, insulated contacts disposed one on each side of the said indicating member and adapted to engage therewith upon a predetermined movement of said indicating member, circuits controlled by such contacts whereby means are provided for actuating the said additional rheostat, all substantially as and for the purpose shown and described.

48. In a storage battery charging system of the character described in combination with a storage battery and a source of supply and leads connecting the same to the said storage battery, a series motor provided with an auxiliary series field winding, said motor connected across the mains of the said source of supply and the leads of the auxiliary series field winding connected in series with the charging leads, a weighted arm attached to the shaft of the said motor and provided with means to close the storage battery on the source of supply upon a predetermined angular movement of said arm, a means inserted in the charging circuit for controlling the applied voltage to the said battery, an ammeter inserted in the charging leads and provided with an indicating member with contacts thereon and insulated contacts disposed one on each side of the said indicating member and adapted to engage therewith upon a predetermined movement of said indicating member, circuits controlled by such contacts whereby means are provided for controlling the means inserted in the charging circuit for controlling the applied voltage to said battery, all substantially as and for the purpose shown and described.

49. In a storage battery charging system of the character described in combination with a storage battery and a source of supply and leads connecting the same to the said storage battery, a series motor provided with an auxiliary series field winding, said motor connected across the mains of the said source of supply and the leads of the auxiliary series field winding connected in series with the charging leads, a weighted arm attached to the shaft of the said motor and provided with means to close the storage battery on the source of supply upon a predetermined angular movement of said arm, a rheostat inserted in the charging leads for controlling the applied voltage to the said battery, an ammeter also inserted in the charging leads and provided with an indicating member with contacts thereon, insulated contacts disposed one on each side of the said indicating member and adapted to engage therewith upon a predetermined movement of said indicating member, circuits controlled by such contacts whereby means are provided for actuating the said rheostat, all substantially as and for the purpose shown and described.

50. In a storage battery charging system of the character described in combination with a storage battery and a source of supply and leads connecting the same to the said storage battery, a series motor provided with an auxiliary series field winding, said motor connected across the mains of the said source of supply and the auxiliary series field winding connected in series with the charging leads, a means provided in the charging leads for controlling the applied voltage to the said storage battery, a weighted arm attached to the shaft of the said motor and provided with means for actuating the said means, and additional means inserted in the charging circuit for assisting the aforesaid means for controlling the applied voltage to the storage battery, an ammeter inserted in the charging leads and provided with an indicating member with contacts thereon, insulated contacts disposed one on each side of the indicating member and adapted to engage therewith upon a predetermined movement of said indicating member, circuits controlled by such contacts whereby means are provided for actuating the said additional means for controlling the applied voltage, all substantially as and for the purpose shown and described.

51. In a storage battery charging system of the character described in combination with a storage battery and a source of supply and leads connecting the same to the said storage battery, a series motor provided with an auxiliary series field winding, said motor connected across the mains of the source of supply and the leads of the said auxiliary series field winding connected in series with the aforesaid leads, a rheostat inserted in the said leads to control the applied voltage to the said storage battery, a weighted arm on the shaft of the aforesaid motor and provided with means to actuate the said rheostat, an ammeter also connected in the said leads and provided with an indicating member with contacts thereon, insulated contacts disposed one on each side of the said indicating member and adapted to engage therewith upon a predetermined movement of said indicating member, an additional rheostat inserted in the said leads to assist the aforesaid rheostat, electric circuits controlled by the engaging of the ammeter contacts to actuate to said additional rheostat, all substantially as and for the purpose shown and described.

52. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the aforesaid leads, a weighted arm attached to the shaft of the said motor, an arm provided with contacts adapted to engage with similar contacts, said engaging of contacts serving to close the storage battery on the source of supply, the aforesaid weighted arm and the arm provided with contacts adapted to engage upon a predetermined movement of the said weighted arm, a means provided in the aforesaid leads for controlling the applied voltage to the said storage battery, an electrical measuring instrument also inserted in the said leads and provided with an indicating member with contacts thereon, insulated contacts disposed one on each side of the said indicating member and adapted to engage therewith upon a predetermined movement of said indicating member, electric circuits controlled by the engaging of such contacts to actuate the aforesaid means to control the applied voltage, all substantially as and for the purpose shown and described.

53. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the aforesaid leads, a weighted arm attached to the shaft of the said motor, an arm provided with contacts and adapted to engage with similar contacts, said engaging of contacts serving to close the storage battery on the source of supply, the aforesaid weighted arm and the arm provided with contacts adapted to engage upon a predetermined angular movement of the said weighted arm, a means provided in the aforesaid leads to control the applied voltage to the said storage battery, an ammeter inserted in the said leads and provided with an indicating member provided with contacts thereon, insulated contacts disposed one on each side of the said indicating member and adapted to engage therewith upon a predetermined movement of said indicating member, electric circuits controlled by the engaging of such contacts to actuate the aforesaid means to control the applied voltage, all substantially as and for the purpose shown and described.

54. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the aforesaid leads, a weighted arm attached to the shaft of the said motor, an arm provided with contacts and adapted to engage with similar contacts, said engaging of contacts serving to close the storage battery on the source of supply, the aforesaid weighted arm and the arm provided with contacts adapted to engage upon a predetermined angular movement of the said weighted arm, a rheostat inserted in the aforesaid leads to control the applied voltage to the said storage battery, an electrical measuring instrument also inserted in the said leads and provided with an indicating member with contacts thereon, insulated contacts disposed one on each side of the said indicating member and adapted to engage therewith upon a predetermined movement of said indicating member, electric circuits controlled by the engaging of such contacts to actuate the said rheostat, all substantially as and for the purpose shown and described.

55. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the said leads, a weighted arm attached to the shaft of the said motor, an arm provided with contacts and adapted to engage with similar contacts, said engaging of contacts serving to close the storage battery on the source of supply, the aforesaid weighted arm and the arm provided with contacts adapted to engage upon a predetermined angular movement of the said weighted arm, a rheostat inserted in the aforesaid leads to control the applied voltage to the said storage battery, an ammeter also inserted in the said leads and provided with an indicating member provided with contacts thereon, insulated contacts disposed one on each side of the said indicating member and adapted to engage therewith upon a predetermined movement of said indicating member, circuits controlled by such contacts whereby means are provided for actuating the said rheostat, all substantially as and for the purpose shown and described.

56. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the aforesaid leads, a means inserted in the aforesaid leads for controlling the applied voltage to the said storage battery and an arm actuating the said means, and means on the shaft of the said motor for actuating the said arm upon a predetermined angular movement of said shaft, an additional means inserted in the aforesaid leads to assist the said means for controlling the applied voltage to the said storage battery, an electrical measuring instrument also inserted in the said leads and provided with an indicating member with contacts thereon, insulated contacts disposed one on each side of the said indicating member and adapted to engage therewith upon a predetermined movement of said indicating member, circuits controlled by such contacts whereby means are provided for actuating the aforesaid additional means for controlling the applied voltage to the said storage battery, all substantially as and for the purpose shown and described.

57. In a storage battery charging system of the character described in combination with a storage battery and a source of supply and leads connecting the same to the said storage battery, a series motor provided with an auxiliary series field winding, said motor connected across the mains of the said source of supply and the leads of said auxiliary series field winding connected in series with the aforesaid leads, a means inserted in the aforesaid leads for controlling the applied voltage to the said storage battery, and an arm actuating the said means, a means on the shaft of the said motor for actuating the said arm upon a predetermined angular movement of said shaft, an additional means inserted in the aforesaid leads to assist the said means for controlling the applied voltage to the said storage battery, an ammeter also inserted in the aforesaid leads and provided with an indicating member with contacts thereon, insulated contacts disposed one on each side of the said indicating member and adapted to engage therewith upon a predetermined movement of the said indicating member, circuits controlled by such contacts whereby means are provided for actuating the said additional means for controlling the applied voltage to the said storage battery, all substantially as and for the purpose shown and described.

58. In a storage battery charging system of the character described in combination with a storage battery and a source of supply and leads connecting the same to the said storage battery, a series motor provided with an auxiliary series field winding, said motor connected across the mains of the said source of supply and the leads of the auxiliary series field winding connected in series with the aforesaid leads, a means inserted in the said leads for controlling the applied voltage to the said storage battery, an auxiliary generator field rheostat connected in series with the main rheostat, a weighted arm provided and attached to the shaft of the said motor and a means provided on the said arm to actuate the said means and the said rheostat, an additional means inserted in the charging leads to assist the aforesaid means to control the applied voltage to the said storage battery, an electrical measuring instrument connected in the said circuit and provided with an indicating member with contacts thereon, insulated contacts disposed one on each side of the said indicating member and adapted to engage therewith upon a predetermined movement of said indicating member, circuits controlled by such contacts whereby means are provided for actuating the said additional means, all substantially as and for the purpose shown and described.

59. In a storage battery charging system of the character described in combination with a storage battery and a source of supply and leads connecting the same to the said battery, a series motor provided with an auxiliary series field winding, said motor connected across the mains of the said source of supply and the leads of the said auxiliary series field winding connected in series with the aforesaid leads, a means inserted in the said leads for controlling the applied voltage to the said storage battery, an auxiliary generator field rheostat connected in series with the main rheostat, a weighted arm provided and attached to the shaft of the said motor and a means provided on the said arm to actuate the said means and the said rheostat, an additional means inserted in the said leads to assist the means for controlling the applied voltage, an ammeter inserted in the said leads and provided with an indicating member with contacts thereon, insulated contacts disposed one on each side of the said indicating member and adapted to engage therewith upon a predetermined movement of the said indicating member, circuits controlled by such contacts whereby means are provided for actuating the said additional means, all substantially as and for the purpose shown and described.

60. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the aforesaid leads, a rheostat inserted in the said leads for controlling the applied voltage to the said storage battery, an auxiliary generator field rheostat connected in series with the main rheostat, a weighted arm provided and attached to the shaft of the said motor, and a means provided on the said arm to actuate the said rheostats, an additional rheostat inserted in the charging leads and an electrical measuring instrument inserted in the said leads and provided with an indicating member with contacts thereon, insulated contacts disposed one on each side of the said indicating member and adapted to engage therewith upon a predetermined movement of said indicating member, circuits controlled by such contacts whereby means are provided for actuating the said additional rheostat, all substantially as and for the purpose shown and described.

61. In a storage battery charging system of the character described in combination with a storage battery and a source of supply and leads connecting the same to the said storage battery, a series motor provided with an auxiliary series field winding, said motor connected across the mains of the said source of supply and the leads of the said auxiliary series field winding connected in series with the aforesaid leads, a rheostat inserted in the said leads for controlling the applied voltage to the said storage battery, an auxiliary rheostat connected in series with the main generator field rheostat, a rheostat arm provided on the said auxiliary rheostat, a weighted arm attached to the shaft of the said motor, said arms adapted to engage upon a predetermined angular movement of said weighted arm, an additional rheostat inserted in the charging circuit to assist the said rheostat for reducing the applied voltage, an electrical measuring instrument also inserted in the said leads and provided with an indicating member with contacts thereon, insulated contacts disposed one on each side of the said indicating member and adapted to engage therewith upon a predetermined movement of said indicating member, circuits controlled by such contacts whereby means are provided for actuating the said additional rheostat, all substantially as and for the purpose shown and described.

In testimony whereof we have signed our respective names to this specification in the presence of two subscribing witnesses.

DAVID R. KNAPP.
HOWARD E. CADE.

Witnesses:
JOHN ALLEN.
R. M. KING.